United States Patent [19]
Gersmann

[11] Patent Number: 6,073,742
[45] Date of Patent: Jun. 13, 2000

[54] SELF-CENTERING DOG CLUTCH

[75] Inventor: Manfred Gersmann, Warendorf, Germany

[73] Assignee: CLAAS Selbstfahrende Erntemaschinen GmbH, Harsewinkel, Germany

[21] Appl. No.: 09/353,721

[22] Filed: Jul. 14, 1999

[30] Foreign Application Priority Data

Jul. 15, 1998 [DE] Germany ............................ 198 31 649

[51] Int. Cl.⁷ .................................................. F16D 11/14
[52] U.S. Cl. .......................................... 192/69.7; 192/108
[58] Field of Search .................... 192/69.7, 69.8, 192/69.82, 108; 464/160

[56] References Cited

U.S. PATENT DOCUMENTS

| | | | |
|---|---|---|---|
| 1,015,259 | 1/1912 | Beale et al. ........................... | 192/69.82 |
| 1,515,100 | 11/1924 | Foster ...................................... | 192/108 |
| 4,433,767 | 2/1984 | Thor ..................................... | 192/108 X |
| 4,840,259 | 6/1989 | Guslits et al. ....................... | 192/108 X |

*Primary Examiner*—Rodney H. Bonck
*Attorney, Agent, or Firm*—Husch & Eppenberger, LLC; Robert E. Muir

[57] ABSTRACT

A self-centering dog clutch includes two coupling-parts is arranged in a simple manner such that components serving for centering purposes are not necessary. Contact faces of the two coupling-parts are off-set relative to the rotational axis of the dog clutch. This results in a radial component of force which serves to center the two coupling-parts. The recesses in the first, driven coupling-part have a larger surface area than the drive claws engaging therein of the second, driving coupling-part. The two coupling-parts can thereby rotate against each other through a predetermined angle. This dog clutch is particularly suitable for use with agricultural machines.

5 Claims, 2 Drawing Sheets

SELF-CENTERING DOG CLUTCH

BACKGROUND OF THE INVENTION

The present invention relates generally to mechanical clutches and more particularly to an improved dog clutch. A dog clutch is used for positively coupling together two shafts including a driven coupling-part and a driving coupling-part, whereby each coupling-part incorporates axially extending drive claws with recesses located therebetween so that the drive claws of one coupling-part will engage in the recesses of the other coupling-part when they are in the coupled state.

The dog clutch being considered here is known in the form of a disengageable and a non-disengageable clutch. It is also referred to as a longitudinally compliant coupling since it can compensate for changes in the axial length of the shafts caused by heat for example or, due to unpredictable constructional inaccuracies. Couplings of this type can disengage when in use but can only be re-engaged when stationary. In the case of a disengageable dog clutch, the two parts of the coupling are centered by means of a ring upon which the interengaging drive claws slide.

Couplings of this type are employed, in particular, when the diameter of the shafts and thus the torques being transferred therebetween are relatively large. One field of application therefor is that of agricultural machines. Thus, for example, in the case of a so-called high speed coupling for mechanically coupling a tractor to an agricultural machine, it is known to couple up the drive train extending between the tractor and the machine by means of a dog clutch. To do this, it is necessary to center the end of the axle to be coupled. The two parts of the coupling are provided with centering surfaces on their opposing faces for this purpose.

The previously known forms of centering require additional components or must be of special design thereby increasing the costs. Moreover, they are not particularly suitable for agricultural machines since they are particularly prone to failure over time, due to the working conditions.

An object of the invention is to provide a dog clutch of the type described with a simplified construction.

Another object is to provide a dog clutch according to the foregoing object and such that no additional components are required for centering the coupling-parts, i.e. such that expensive, specially designed components are not needed in order to meet the demands imposed by an agricultural environment.

Yet another object is to provide a dog clutch with a self-centering function.

SUMMARY OF THE INVENTION

In accordance with the invention there is provided a self-centering dog clutch for positively coupling two shafts having a rotational axis, the dog clutch including a first coupling-part and a second coupling-part, each coupling-part incorporating axially extending drive claws with recesses therebetween so that the drive claws of one coupling-part will engage in the recesses of the other coupling-part when they are in a coupled state; the drive claws having torque-conveying, axially-extending contact faces which are off-set relative to the rotational axis; and the contact faces being so constructed and arranged that a radial component of force of a closed triangle of forces serves for self-centering the two coupling-parts.

The objects are achieved in that the torque-conveying, axially-directed contact faces of the drive claws of the two coupling-parts are off-set relative to the rotational axis of the dog clutch thus resulting in a radial component of force in a closed triangle of forces which serves for self-centering the two coupling-parts.

In the case of a dog clutch embodying the invention, no additional components are required for centering the two coupling-parts as the torque-conveying drive claws are now designed such that they will be self-centering due to the forces involved. Since, in the case of previously known couplings, the torque-conveying contact faces were always directed along the axis of rotation, only tangential components of force were created. The component of the perpendicular force determining the torque deviates from a tangential component thereby resulting in a radial force which causes the self-centering action.

To make it easier to couple the two coupling-parts together, provision is made for the drive claws of a first coupling-part to have a smaller surface area, taken with respect to the end face, than the recesses located therebetween, and for the drive claws of the second coupling-part to have a smaller surface area than the recesses in the first coupling-part so that the coupling-parts can rotate against each other when they are in the coupled state. Now, since the coupling-parts can rotate against each other through a certain angle without one driving or following the other, it is no longer necessary for the two coupling-parts to be precisely aligned before they are coupled together. This is of especial advantage, particularly in the case of agricultural machines.

After the two coupling-parts have been coupled together, the driving coupling-part can then be rotated but, as soon as the contact surfaces conveying the torque make contact, one of the coupling-parts will move radially so as to center the two.

The drive claws of at least one coupling-part are made asymmetric relative to the rotational axis of the dog clutch. From this, it is particularly advantageous if the drive claws of the first coupling-part are triangular in shape and if the drive claws of the second coupling-part are trapezoidal. Such an arrangement thereby immediately allows relative movement through a predetermined angle of the first coupling-part relative to the other.

Here, however, the design may again be such that the axes of symmetry of the drive claws of the two coupling-parts are directed along the axis of rotation of the dog coupling. The radial component will be increased if the triangular drive claw in one coupling-part is such that the spacing between the inner facing edges of two drive claws is less than the spacing between the outer edges of two drive claws. As a result of this design, the ensuing recesses in one of the coupling-parts may be considered as being trapezoidal.

BRIEF DESCRIPTION OF THE DRAWINGS

Reference is now made more particularly to the drawings which illustrate the best presently known mode of carrying out the invention and wherein similar reference characters indicate the same parts throughout the views.

DETAILED DESCRIPTION

Figure 1:
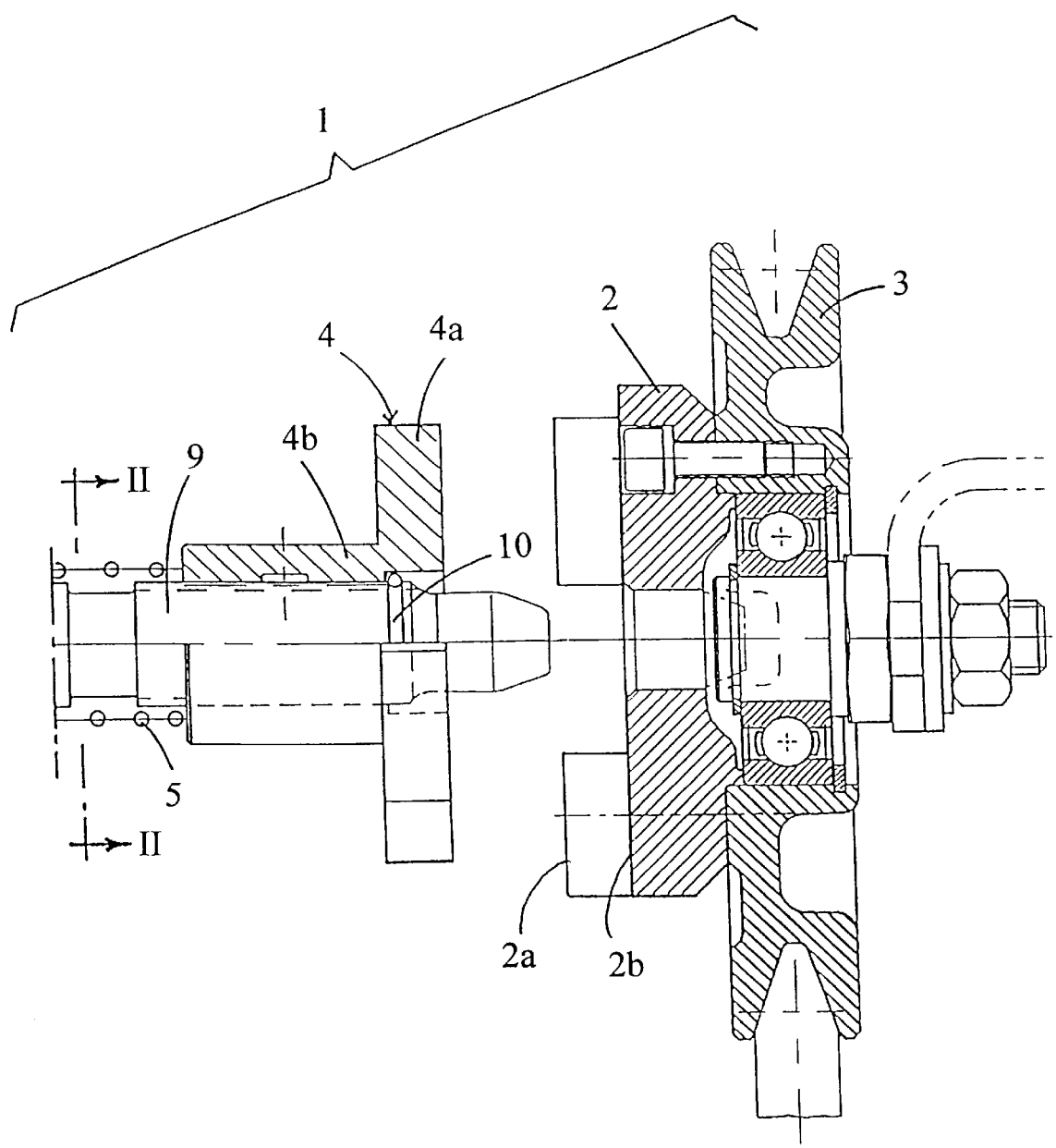
FIG. 1 is a view, partly elevational and partly in longitudinal section, of a dog clutch in accordance with the invention in its uncoupled state.

The dog clutch 1 illustrated in the Figs. can be employed in many different applications, but particularly in the case of agricultural machines. The first coupling-part 2 is bolted to a pulley 3 for driving a not-illustrated implement or mechanism. Mechanisms other than a pulley may also be used for this purpose. The dog clutch illustrated is a disengageable clutch whence a second coupling-part 4 is insertable in the axially direction. For this purpose, the second coupling-part 4 is moveable toward the first coupling-part 2 by means of a pressure spring 5. Disengagement is effected in a manner not-illustrated in detail, for example, by means of a clutch release lever or a servo device. Dog clutches are usually equipped with an odd number of drive claws. In the embodiment illustrated, the first coupling-part 2 is equipped with three drive claws 2a, and the second coupling-part 4 is also be equipped with three drive claws 4a. The drive claws 4a are fixed to a hub 4b. The direction of rotation of the two coupling-parts 2 and 4 is indicated by arrow A.

Figure 2:
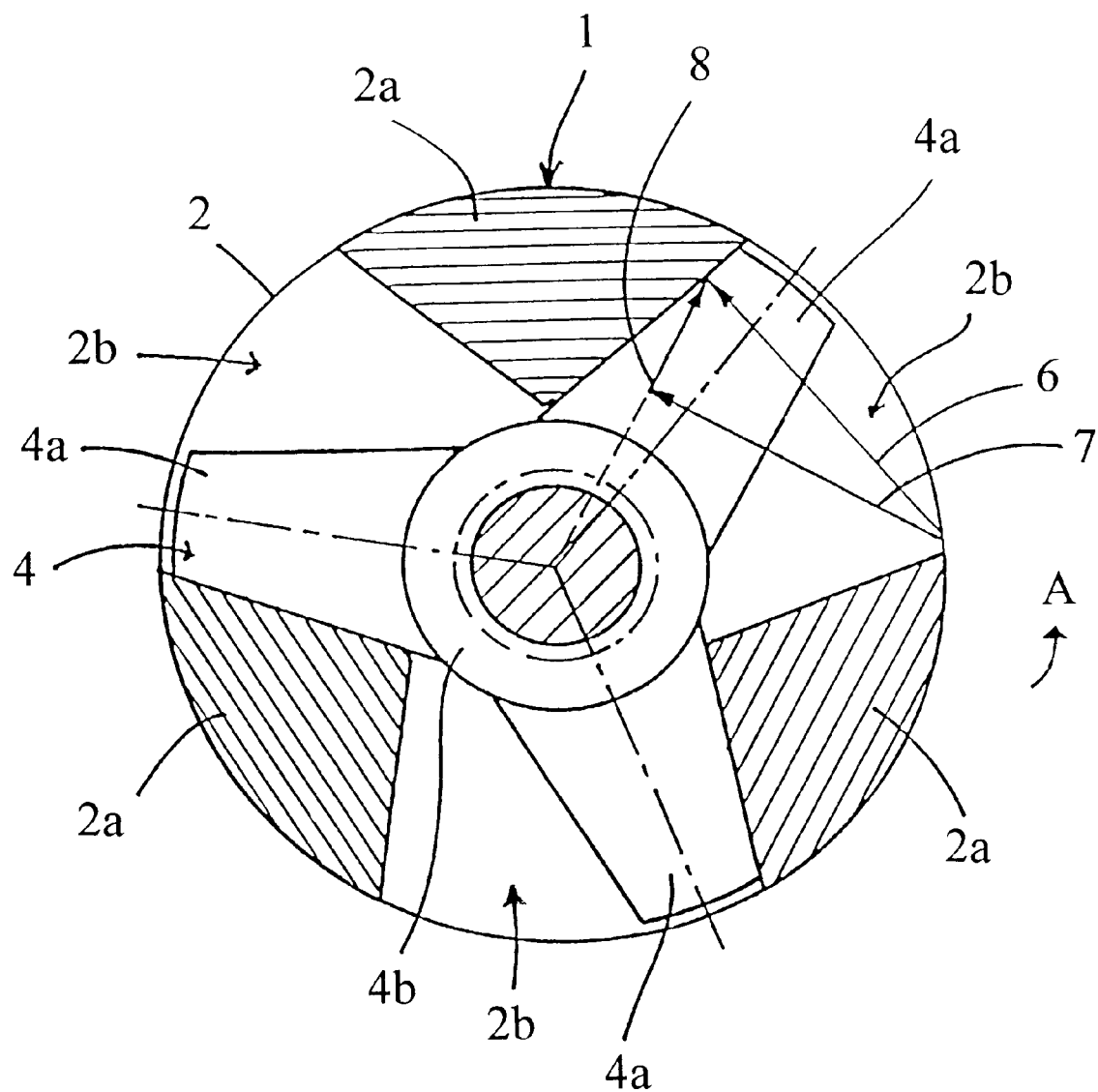
FIG. 2 is a cross-sectional view taken generally along line II—II in FIG. 1.

As is apparent from FIG. 2, the drive claws 2a in the first coupling-part 2 are generally triangular in shape while the drive claws 4a in the second coupling-part 4 are generally trapezoidal. FIG. 2 also shows that the recesses 2b located between the drive claws 2a have a surface area that is considerably greater than that of the drive claws 4a in the second coupling-part 4. The torque-conveying contact faces are off-set relative to the rotational axis of the dog clutch 1, i.e. they do not intersect the rotational axis of the coupling in contrast to the arrangement in previously known clutches.

As is also apparent from FIG. 2, the two coupling-parts 2 and 4 can be rotated against each other through a predetermined angle without thereby driving the pulley 3. The normal force determining the torque is perpendicular to the contact faces of the drive claws 2a and 4a as is indicated by the reference arrow 6 in FIG. 2. This normal force 6 is resolved into a tangential peripheral component of force 7 and a radial component of force 8. The radial component of force 8 causes the two coupling-parts 2 and 4 to be relatively displaced radially. A self-centering effect is thereby achieved. The first coupling-part 2 bolted to the pulley 3 advantageously is made of a synthetic material. In contrast thereto, the second, driving coupling-part 4 is made of metal.

FIG. 2 shows that the recesses 2b of the first coupling-part 2 are approximately trapezoidal. In other words, the sides of the recesses converge slightly from the outer circumference toward the center so that the spacing of the outermost regions of two adjacent drive claws 2a is just slightly larger than the spacing between the innermost regions thereof. Again, it is apparent from FIG. 2, that the axes of symmetry of each of the drive claws 2a and 4a intersect at the point of rotation of the dog clutch 1. As is depicted in FIG. 2, the second coupling-part 4 is generally in the form of a "star" insofar as its drive claws 4a are concerned. In other words, the three drive claws 4a are located 120 degrees from each other and thereby look like a "star". In the embodiment illustrated, the hub 4b is internally grooved and is mated with an externally splined bushing 9. As previously mentioned, the pressure spring 5 presses the second coupling-part 4 against the first coupling-part 2. The bushing 9 is carried along by a fastener conveniently in the form of a circlip 10.

The invention is not restricted to the embodiment illustrated. The matter of basic importance is that the contact faces of the drive claws 2a and 4a should be off-set relative to the rotational axis of the dog clutch 1 so that a radial component of force 8 will be produced by the torque being conveyed in order to center the two coupling-parts 2 and 4.

I claim:

1. A self-centering dog clutch for positively coupling two shafts having a rotational axis, the dog clutch including a first coupling-part and a second coupling-part, each coupling-part incorporating axially extending drive claws with recesses therebetween so that the drive claws of one coupling-part will engage in the recesses of the other coupling-part when they are in a coupled state; the drive claws having torque-conveying, axially-extending contact faces which are off-set relative to the rotational axis; and the contact faces being so constructed and arranged that a radial component of force of a closed triangle of forces serves for self-centering the two coupling-parts.

2. A self-centering dog clutch in accordance with claim 1, wherein the drive claws of the first coupling-part have a smaller surface area, taken with respect to the end face, than the recesses located therebetween, and the drive claws of the second coupling-part have a smaller surface area than the recesses of the first coupling-part so that the coupling-parts and can rotate against each other when they are in the coupled state.

3. A self-centering dog clutch in accordance with claim 2 wherein the drive claws of the first coupling-part are triangular in shape and the drive claws of the second coupling-part are trapezoidal.

4. A self-centering dog clutch in accordance with claim 1 wherein the axes of symmetry of the drive claws and of the first coupling-part and the second coupling-part are directed along the axis of rotation of the dog clutch.

5. The dog clutch in accordance with claim 1 wherein the spacing between inner facing edges of the two drive claws of the first coupling-part including triangular drive claws is less than that between outer edges of the drive claws.

* * * * *